Figure 3:
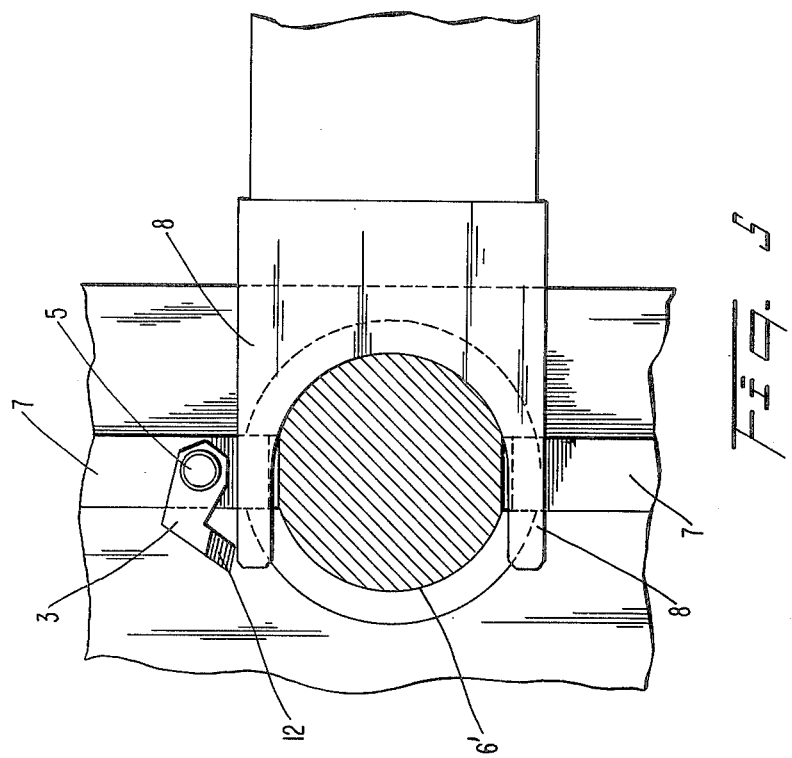

United States Patent [19]

Stoilov et al.

[11] 4,019,245
[45] Apr. 26, 1977

[54] DEVICE FOR CLAMPING TOOLS IN THE SEAT OF A TOOL MAGAZINE

[75] Inventors: Nikola Dimov Stoilov; Ivan Konstantinov Hoklar, both of Sofia, Bulgaria

[73] Assignee: Institute za Metalloobrabotvashti Machini, Sofia, Bulgaria

[22] Filed: Sept. 25, 1975

[21] Appl. No.: 616,774

Related U.S. Application Data

[62] Division of Ser. No. 542,456, Jan. 20, 1975, abandoned.

[52] U.S. Cl. .............................. 29/568; 279/1 B; 82/36 R
[51] Int. Cl.[2] ....................................... B23Q 3/155
[58] Field of Search .......... 82/36 R; 29/26 A, 568; 211/1.5, 60 T, 69; 279/1 B

[56] References Cited

UNITED STATES PATENTS

| 2,251,470 | 8/1941 | Stacey | 279/1 B |
| 3,277,569 | 10/1966 | Verhoeven | 29/568 |
| 3,662,442 | 5/1972 | Noa | 29/26 A |
| 3,680,436 | 8/1972 | Marsland | 279/1 B |

Primary Examiner—Leonidas Vlachos

[57] ABSTRACT

A device for clamping tools in the seat of a tool magazine. The device has a cam at the one end of which there is a projection which is adapted to be contacted by the grip of the autooperator. The cam is seated on an axle which is located in the face portion of the seat of the tool magazine; stops are provided for determining the terminal positions of the cam. The cam may be shaped as a plate, in one end of which there is a stop for engagement with a key of the seat of the tool magazine.

1 Claim, 5 Drawing Figures

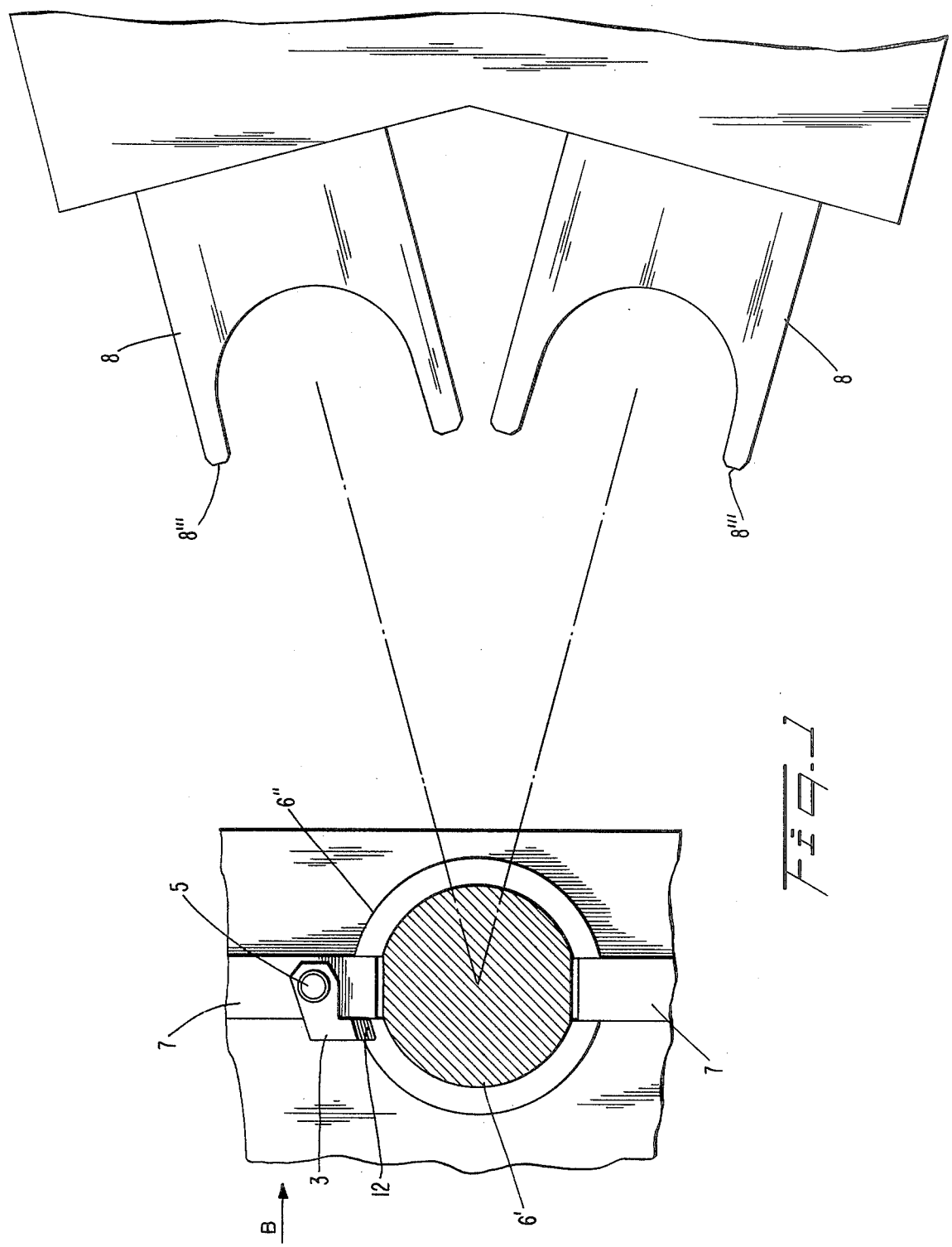

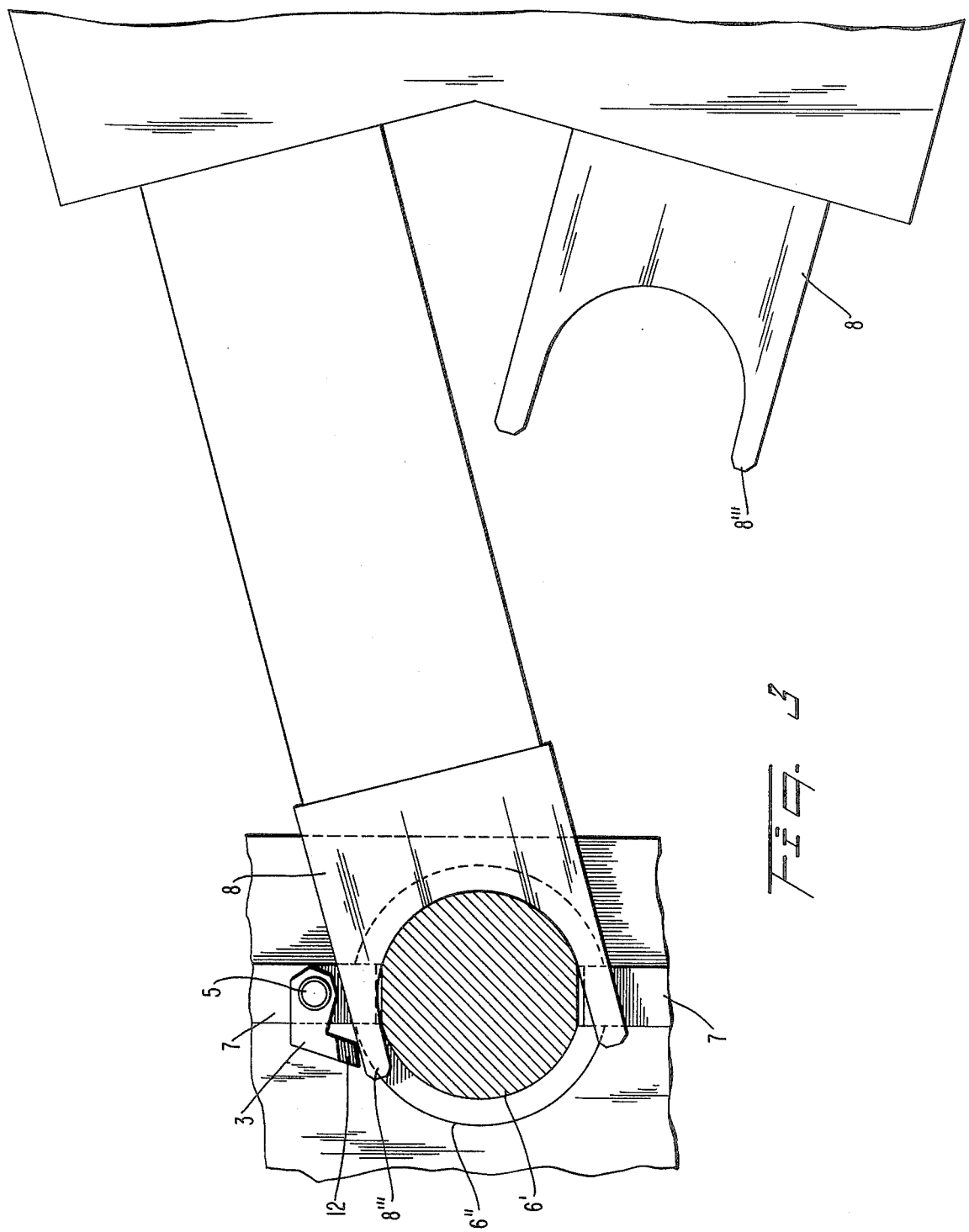

DEVICE FOR CLAMPING TOOLS IN THE SEAT OF A TOOL MAGAZINE

This is a division of application Ser. No. 542,456, filed Jan. 20, 1975, now abandoned.

This invention relates to a device for clamping tools in the seat of a tool magazine, particularly in multi-operation machines with rotating tools.

Designs are known in which each tool is attached by means of a screw to the seat of the magazine. Each seat can be positioned in front of a coupling with which the corresponding screw is screwed on or unscrewed, so that the tools in the magazine are selectively fastened or loosened. The drawbacks of such designs are the unnecessary compaction of the design, as well as the slow process of clamping the tools.

Designs are also known in which each tool is attached by means of a fork. Each fork can be positioned in front of an electric magnet, a hydraulic cylinder or a pneumatic cylinder, by means of which the corresponding fork is transferred and thus the tool is loosened from the seat of the magazine. The drawbacks of such designs are the same as the prior design first mentioned above, although in a smaller degree.

Further designs are known in which the tools are fastened by means of spring clamps in the end of each seat. There are two types of such devices: (1) non-blocking clamps and (2) clamps with blocking of the tools in all seats of the magazine with the exception of the seat which is in the proper position for a tool change. The first design is very simple, but the clamping of heavy tools is not at all reliable. The second design is more reliable, but the system for opening the clamps is complicated.

It is a common drawback of all aforementioned designs that they can be used only in the case of specific shapes of the tail or shank of the tool. This makes the tool magazine non-versatile. This drawback is often manifested, since different manufacturing firms produce tools with different tails (in shapes or sizes). The latter is a consequence of the fact that there exist different designs of devices for clamping the tools to the work spindle.

It is therefore a general object of the present invention to avoid the drawbacks of the known designs by providing a device for clamping tools with different shanks or tails in one and the same seat of the magazine, such clamping being simple, reliable and applicable to all types of tool magazines for machines with autooperator.

Figure 2:
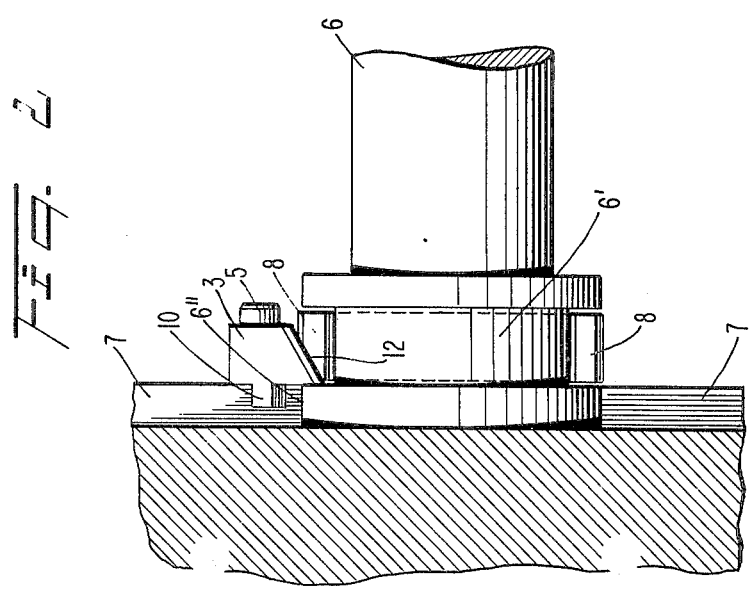
Figure 4:
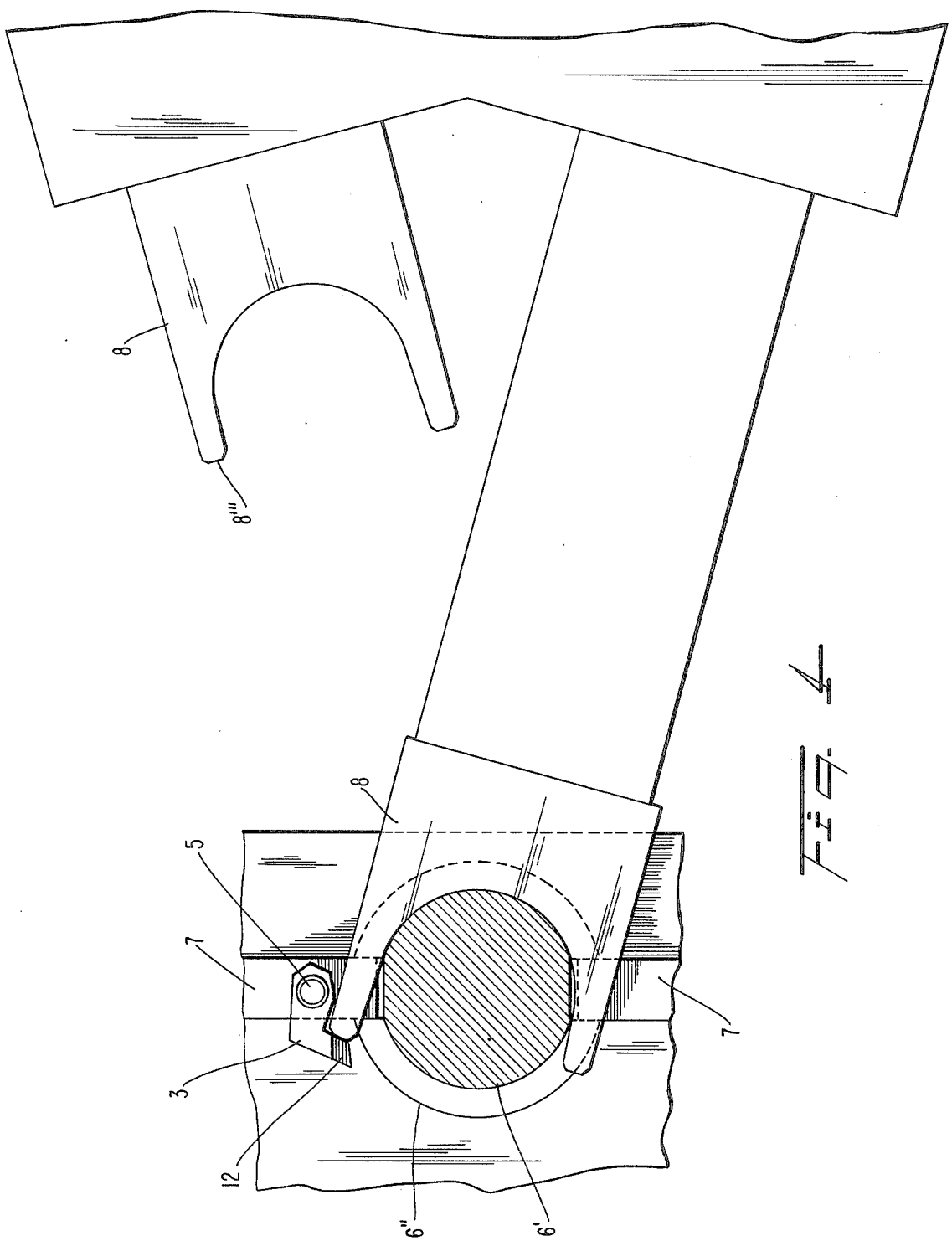

This object is achieved by the device of the invention which comprises a cam, at the one end of which there is provided a projection in which is adapted to be engaged by of the grip of the autooperator or tool changing mechanism. The cam is seated on an axle attached to the face portion of the seat of the tool magazine. There is at least one motion limiter or stop for determining the end position of the cam. For a better understanding of the invention, reference should be made to the accompanying drawings in which there are illustrated and described preferred embodiments of the invention. In the drawings:

FIG. 1 illustrates an embodiment of the device;
FIG. 2 is a view in the direction B in FIG. 1;
FIG. 3 shows the loosening of the tool by means of the upper grip;
FIG. 4 shows the loosening of the tool by means of the bottom grip;
FIG. 5 shows the loosening of the tool in the embodiment of FIG. 1 of the device in the case of a perpendicularly approaching grip or mechanical hand.

An embodiment of the device of the invention is shown in FIGS. 1, 2, 3, 4 and 5, such embodiment consists only of a cam 3 and an axle 5. The loosening of the tool 6 from the cam 3, and blocking it, is effected by the faces 8" of the grip 8 (FIGS. 3 and 4). Then there follows the pulling out of the tool from the seat and its transfer for a change of tools. Under the action of its own weight the cam 3 returns to its initial position (FIG. 1), which is defined by the engagement of lug 10 with key 7 (FIG. 2). After the change of the tools 9, the mechanical hand 8 returns the "old" tool and begins to push it into the seat. Shortly before the end of this motion, the flange 6" of the tool reaches the bevelled front part of the cam. The cam 3 is lifted and the tool 6 enters into the seat (FIGS. 4 and 5). With a motion transverse to the axis of the tool 6, the mechanical hand 8 is pulled from the seat, leaving the tool 6 in the magazine. After the removal of grip 8, the cam 3 returns in its initial position (FIG. 1), and enters the groove 61 (FIG. 2), the tool thus being blocked.

This embodiment can also be employed without any modifications in the case of autooperators with one or two non-intersecting mechanical hands. This is illustrated in FIG. 5.

Although the invention is illustrated and described with reference to a plurality of preferred embodiments thereof, it is to be expressly understood that is is in no way limited to the disclosure of such a plurality of preferred embodiments, but is capable of numerous modifications within the scope of the appended claims.

What is claimed is:

1. A device for clamping tools in the seat of a tool magazine, said seat having at least one key, comprising an axle located in the face portion of the seat of the tool magazine, a cam member pivotally mounted on said face portion adjacent to said axle, the cam being L-shaped and having a front part which is beveled, and a stop projecting from the cam adapted to engage the key of the seat of said tool magazine and a grip adapted to move in a substantially perpendicular direction relative to the axis of said axle and to remove or place a tool in said seat of the tool magazine after said stop has been displaced from said key by said grip, said cam member and axle being so arranged that only the cam's weight applies a rotary torque to the cam to rotate the cam about the axle towards the tool and abut said stop against said key.

* * * * *